(12) United States Patent
Breault et al.

(10) Patent No.: US 12,460,819 B2
(45) Date of Patent: Nov. 4, 2025

(54) CONTINUOUS FLOW FUEL SYSTEM

(71) Applicant: RTX Corporation, Farmington, CT (US)

(72) Inventors: Andrew E. Breault, Bolton, CT (US); Jon Erik Sobanski, Glastonbury, CT (US); Jeffrey T. Morton, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/598,529

(22) Filed: Mar. 7, 2024

(65) Prior Publication Data
US 2025/0283601 A1 Sep. 11, 2025

(51) Int. Cl.
*F23R 3/28* (2006.01)
*F02C 7/16* (2006.01)
*F02C 7/22* (2006.01)

(52) U.S. Cl.
CPC ............... *F23R 3/283* (2013.01); *F02C 7/16* (2013.01); *F02C 7/22* (2013.01)

(58) Field of Classification Search
CPC .. F23R 3/28; F23R 3/283; F23R 2900/00004; F02C 7/22; F02C 7/222; F02C 7/228; F02C 7/236; F02M 39/00; F02M 39/005; F02M 39/02
See application file for complete search history.

(56) References Cited

U.S. PATENT DOCUMENTS

| | | | |
|---|---|---|---|
| 2,984,970 A * | 5/1961 | Bollenbacher | F02C 7/228 60/746 |
| 4,104,873 A * | 8/1978 | Coffinberry | F02C 7/14 60/39.83 |
| 4,402,184 A * | 9/1983 | Faulkner | F02C 7/222 60/739 |
| 5,116,362 A * | 5/1992 | Arline | F02C 7/236 60/734 |
| 6,729,135 B1 | 5/2004 | Norris et al. | |
| 10,526,972 B2 * | 1/2020 | Snyder | F02C 7/22 |
| 11,053,854 B1 * | 7/2021 | McIntyre, II | F23R 3/283 |
| 11,199,325 B2 * | 12/2021 | Chukrallah | F02C 7/264 |
| 11,230,979 B2 * | 1/2022 | Waddleton | F02C 7/22 |

(Continued)

FOREIGN PATENT DOCUMENTS

| | | | | |
|---|---|---|---|---|
| CN | 118523153 A | * | 8/2024 | |
| DE | 102023108896 A1 | * | 10/2023 | F02C 7/228 |

(Continued)

OTHER PUBLICATIONS

Extended European Search Report dated Aug. 29, 2025, for corresponding European Patent Application No. 25162440.9-1009, 9 pgs.

*Primary Examiner* — Craig Kim
(74) *Attorney, Agent, or Firm* — Kinney & Lange, P.A.

(57) ABSTRACT

A fuel system for a gas turbine engine includes a manifold assembly with an assembly inlet, an assembly outlet, and a plurality of fuel injectors. The manifold assembly also includes at least one fuel manifold fluidically connecting each fuel injector of the plurality of fuel injectors to the assembly inlet and to the assembly outlet. A fuel return line is fluidically connected to the assembly outlet. A fuel circulator pump includes a pump outlet fluidically connected to the assembly inlet.

13 Claims, 11 Drawing Sheets

(56) References Cited

U.S. PATENT DOCUMENTS

| | | | |
|---|---|---|---|
| 11,242,800 B2 | 2/2022 | Jain et al. | |
| 11,555,456 B2 * | 1/2023 | Morenko | F02C 6/02 |
| 11,713,723 B2 | 8/2023 | Jarvo et al. | |
| 11,933,225 B2 * | 3/2024 | Mochrie | F02C 7/224 |
| 11,946,420 B1 * | 4/2024 | Goy | F02C 7/222 |
| 12,025,084 B1 * | 7/2024 | Susca | F02M 37/18 |
| 12,060,831 B1 * | 8/2024 | Williams | F02C 7/228 |
| 12,078,109 B2 * | 9/2024 | Mochrie | F02C 7/236 |
| 12,110,827 B1 * | 10/2024 | Rambo | F02C 7/32 |
| 12,241,419 B2 * | 3/2025 | Ryon | F02C 7/232 |
| 2002/0184884 A1 * | 12/2002 | McCarty | F02C 9/263 60/773 |
| 2013/0061599 A1 | 3/2013 | Van | |
| 2013/0219911 A1 * | 8/2013 | Dudebout | F02C 7/26 60/778 |
| 2014/0060658 A1 * | 3/2014 | Hains | F02C 7/22 137/2 |
| 2014/0311599 A1 * | 10/2014 | Haugsjaahabink | F02C 9/30 137/565.11 |
| 2015/0020528 A1 * | 1/2015 | Fuller | F02C 7/222 60/746 |
| 2015/0176496 A1 * | 6/2015 | Zordan | F02C 7/228 137/561 A |
| 2015/0337734 A1 * | 11/2015 | Chalaud | F02C 7/22 60/39.48 |
| 2016/0281656 A1 * | 9/2016 | Alecu | F02C 7/236 |
| 2017/0268781 A1 * | 9/2017 | Stevenson | F02C 9/34 |
| 2018/0050812 A1 * | 2/2018 | Ribarov | F02C 7/236 |
| 2018/0156126 A1 * | 6/2018 | Snyder | F02C 7/228 |
| 2018/0163637 A1 | 6/2018 | Griffiths | |
| 2018/0274785 A1 | 9/2018 | Prociw et al. | |
| 2018/0363552 A1 * | 12/2018 | Zhang | F02C 3/24 |
| 2019/0137104 A1 * | 5/2019 | Jain | F02C 7/222 |
| 2020/0025081 A1 * | 1/2020 | Dyer | F02C 7/236 |
| 2020/0300168 A1 * | 9/2020 | Herring | F02C 7/22 |
| 2023/0279813 A1 * | 9/2023 | Mochrie | F02C 7/228 60/730 |
| 2023/0279815 A1 * | 9/2023 | Mochrie | F02C 7/22 60/39.281 |
| 2024/0209792 A1 * | 6/2024 | Madden | B64D 27/10 |
| 2024/0271571 A1 * | 8/2024 | Williams | F02C 7/228 |
| 2024/0310042 A1 * | 9/2024 | Smith | F02C 7/222 |
| 2024/0328622 A1 * | 10/2024 | Benjamin | F23R 3/42 |

FOREIGN PATENT DOCUMENTS

| | | | | |
|---|---|---|---|---|
| DE | 102023134404 A1 * | 6/2024 | | F02B 37/10 |
| EP | 3211200 B1 * | 8/2019 | | F02C 3/04 |
| EP | 3061949 B1 * | 2/2020 | | F02C 7/222 |
| EP | 4239173 A1 * | 9/2023 | | F02C 7/14 |
| EP | 4431399 A1 * | 9/2024 | | B64D 37/06 |
| EP | 4431809 A1 * | 9/2024 | | F02C 3/30 |
| GB | 2529636 A * | 3/2016 | | F02C 7/222 |
| GB | 2578106 A * | 4/2020 | | F02C 7/22 |
| WO | WO-2024213201 A1 * | 10/2024 | | F04F 5/24 |

* cited by examiner

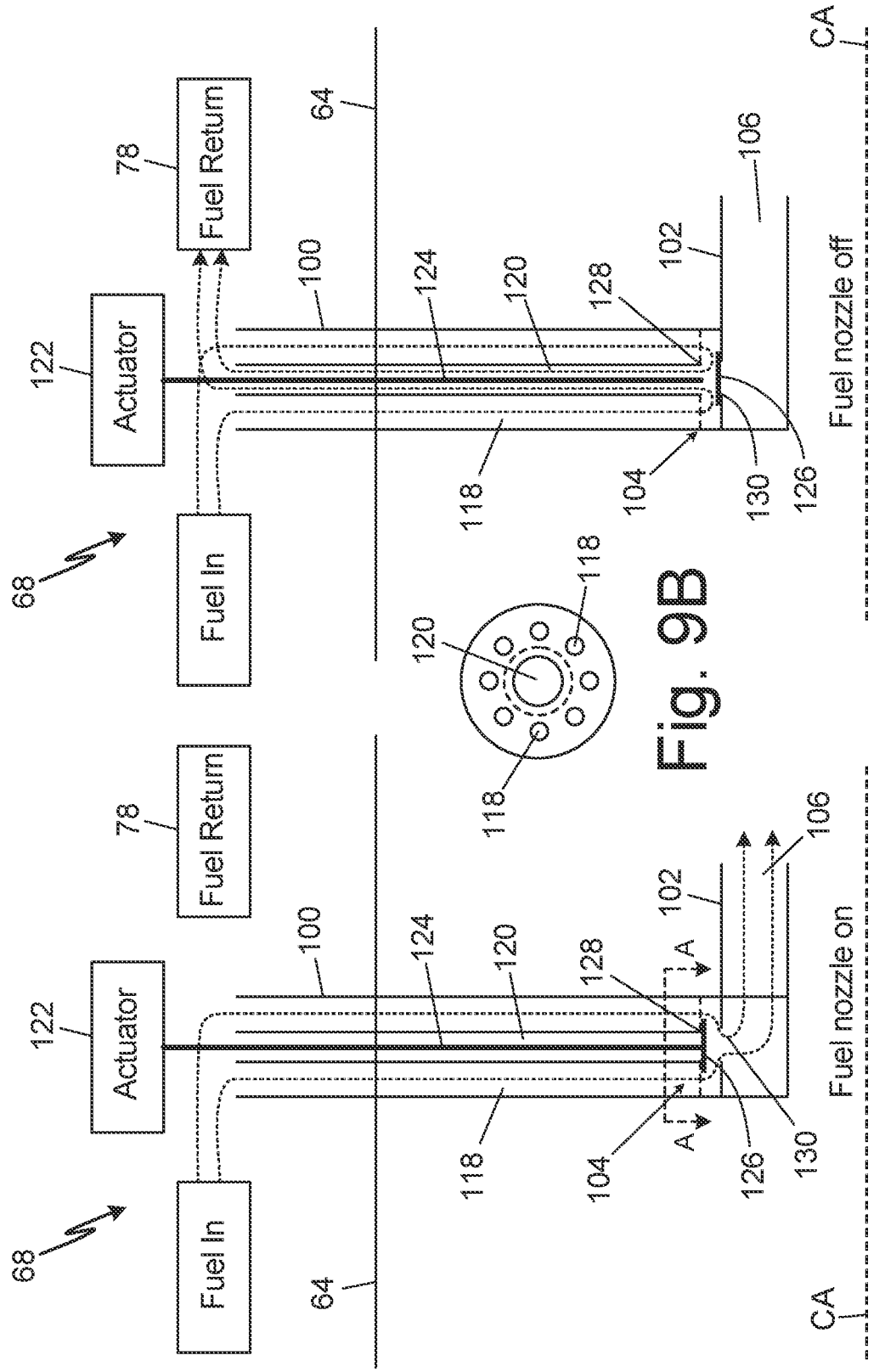

CONTINUOUS FLOW FUEL SYSTEM

BACKGROUND

The present disclosure relates to gas turbine engines and, more particularly, to reducing coking in the fuel system.

Fuel nozzles inject fuel into a combustor of gas turbine engines. During operation, fuel flow through the fuel nozzles of the fuel system is used to thermally condition the nozzles and prevent coking from occurring in the nozzles and neighboring fuel lines. At shutdown of a gas turbine engine, fuel flow is halted and heat from the combustor and case structure soaks into the fuel system, leading to coking in the fuel system. Coke buildup compromises fuel nozzle performance and drives maintenance.

SUMMARY

In one example, a fuel system for a gas turbine engine includes a manifold assembly with an assembly inlet, an assembly outlet, and a plurality of fuel injectors. The manifold assembly also includes at least one fuel manifold fluidically connecting each fuel injector of the plurality of fuel injectors to the assembly inlet and to the assembly outlet. A fuel return line is fluidically connected to the assembly outlet. A fuel circulator pump includes a pump outlet fluidically connected to the assembly inlet.

In another example, a method is disclosed for cooling a fuel system of a gas turbine engine. The method includes shutting down the gas turbine engine. After shutting down the gas turbine engine, a fuel circulator pump is activated to flow fuel into at least one fuel manifold and a plurality of fuel injectors fluidically connected to the at least one fuel manifold. The fuel is directed from the at least one fuel manifold and the plurality of fuel injectors into a fuel return line.

In another example, a fuel injector for a gas turbine engine includes a strut and a nozzle head connected to the strut. The nozzle head includes a nozzle exit. A supply passage extends through the strut to the nozzle head. A return passage extends through the strut toward the nozzle head. A valve is within the strut and/or nozzle head and fluidically connects the supply passage to the nozzle exit.

BRIEF DESCRIPTION OF THE DRAWINGS

FIG. 9A is a schematic illustration of a fuel injector of the fuel system of any of FIGS. 3-8 with an actuator, a valve in an "on" position, and a return line.

FIG. 9B is a cross-sectional view of a strut of the fuel injector of FIG. 9A taken along line A-A.

FIG. 9C is a schematic illustration of the fuel injector of FIG. 9A with the valve in an "off" position.

Figure 1:
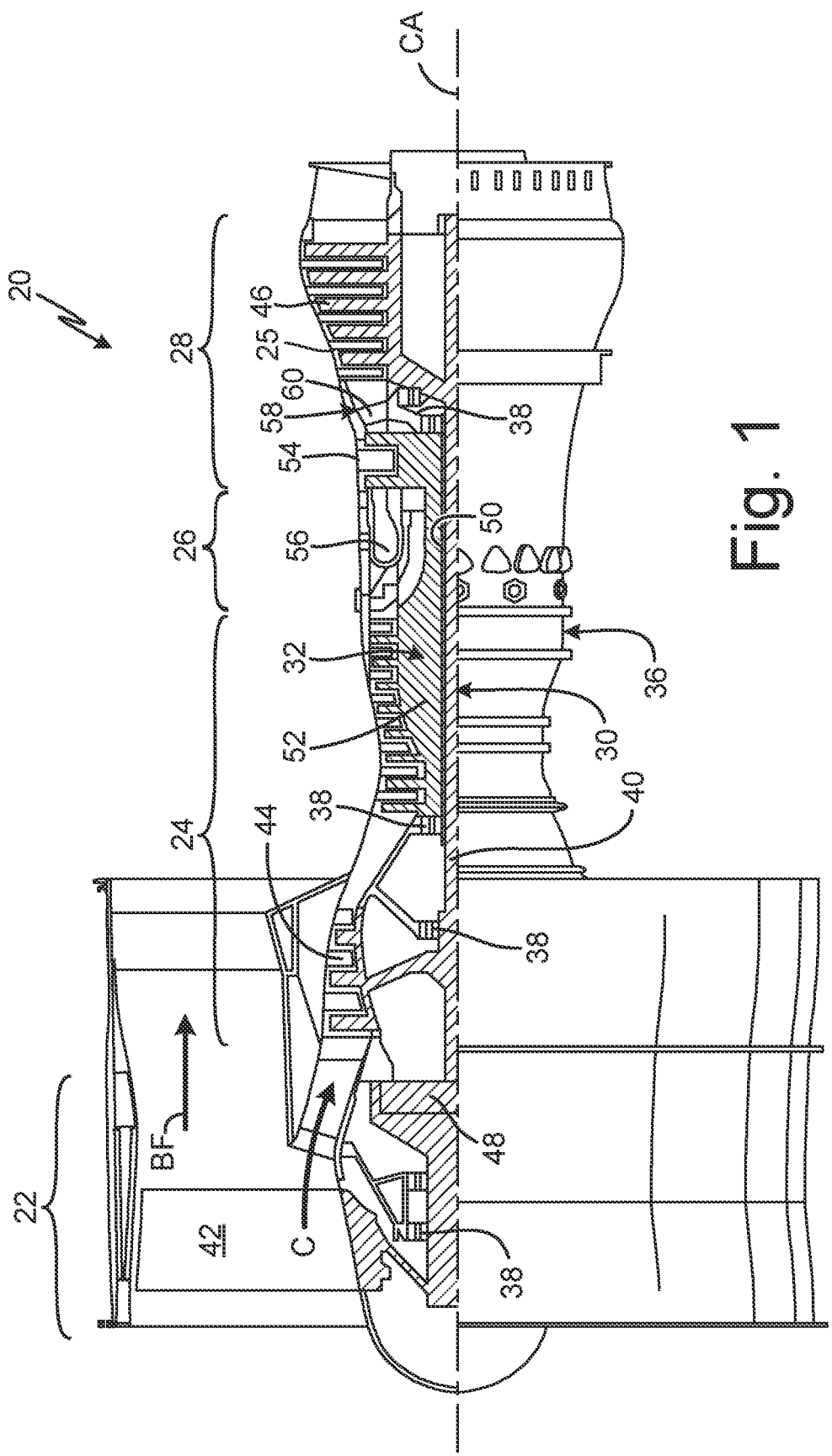
FIG. 1 is a partial cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The disclosure relates to a fuel system of a gas turbine engine with a manifold and a fuel circulator pump that circulates fuel through the fuel system when the gas turbine engine is off. Fuel injectors of the fuel system include internal valving that prevents the fuel injectors from injecting fuel into a combustor of the gas turbine engine when the gas turbine engine is off. The internal valving can also allow the fuel to circulate through the fuel injectors while the fuel circulates through the fuel system. Allowing fuel to circulate through the fuel system and the fuel injectors during and/or after shut down of the gas turbine engine mitigates the formation of local fuel hotspots resulting from increased levels of conduction and/or radiation from the gas turbine engine. Avoiding local hot spots will reduce the likelihood of coke forming in the fuel injectors and the lines of the fuel system as heat soaks back through the cases of the gas turbine engine and into the fuel system. The reduced likelihood of coke formation will maintain fuel injector performance by maintaining intended fuel flow splits and distribution, which in turn maintains ideal combustor pattern factor. Maintaining fuel injector performance results in improved reliability and time on wing of the gas turbine engine. The fuel system is discussed below with reference to the figures.

FIG. 1 is a quarter-sectional view that schematically illustrates example gas turbine engine 20 that includes fan section 22, compressor section 24, combustor section 26 and turbine section 28. Alternative engines might include an augmenter section (not shown) among other systems or features. Fan section 22 drives air along bypass flowpath BF while compressor section 24 draws air in along core flowpath C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24. Core casing 25 is disposed around compressor section 24, combustor section 26 and turbine section 28 and separates these sections from bypass flowpath BF.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; an open rotor gas turbine engine; a reverse-flow gas turbine engine; and a turbine engine including a three-spool architecture in which three spools concentrically rotate about a common axis CA where a low spool enables a low pressure turbine to drive a fan or open rotor via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low-speed spool 30 and high-speed spool 32 mounted for rotation about center axis CA of gas turbine engine 20 relative to engine static structure 36 via several bearing systems 38. It should be understood that various bearing systems 38 at various locations may alternatively or additionally be provided.

Low-speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low-speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about center axis CA.

Combustor 56 is arranged between high pressure compressor 52 and high pressure turbine section 54. In one example, high pressure turbine section 54 includes at least two stages to provide double stage high pressure turbine section 54. In another example, high pressure turbine section 54 includes only a single stage. As used herein, a "high pressure" compressor or turbine experiences a higher pressure than a corresponding "low pressure" compressor or turbine.

Mid-turbine frame 58 of engine static structure 36 can be arranged generally between high pressure turbine section 54 and low pressure turbine 46. Mid-turbine frame 58 further supports bearing systems 38 in turbine section 28 as well as setting airflow entering the low pressure turbine 46.

The gas flow in core flowpath C is compressed first by low pressure compressor 44 and then by high pressure compressor 52 mixed with fuel and ignited in combustor 56 to produce high pressure exhaust gases that are then expanded through high pressure turbine section 54 and low pressure turbine 46. Mid-turbine frame 58 includes vanes 60, which are in the core flowpath and function as an inlet guide vane for low pressure turbine 46.

Figure 2:
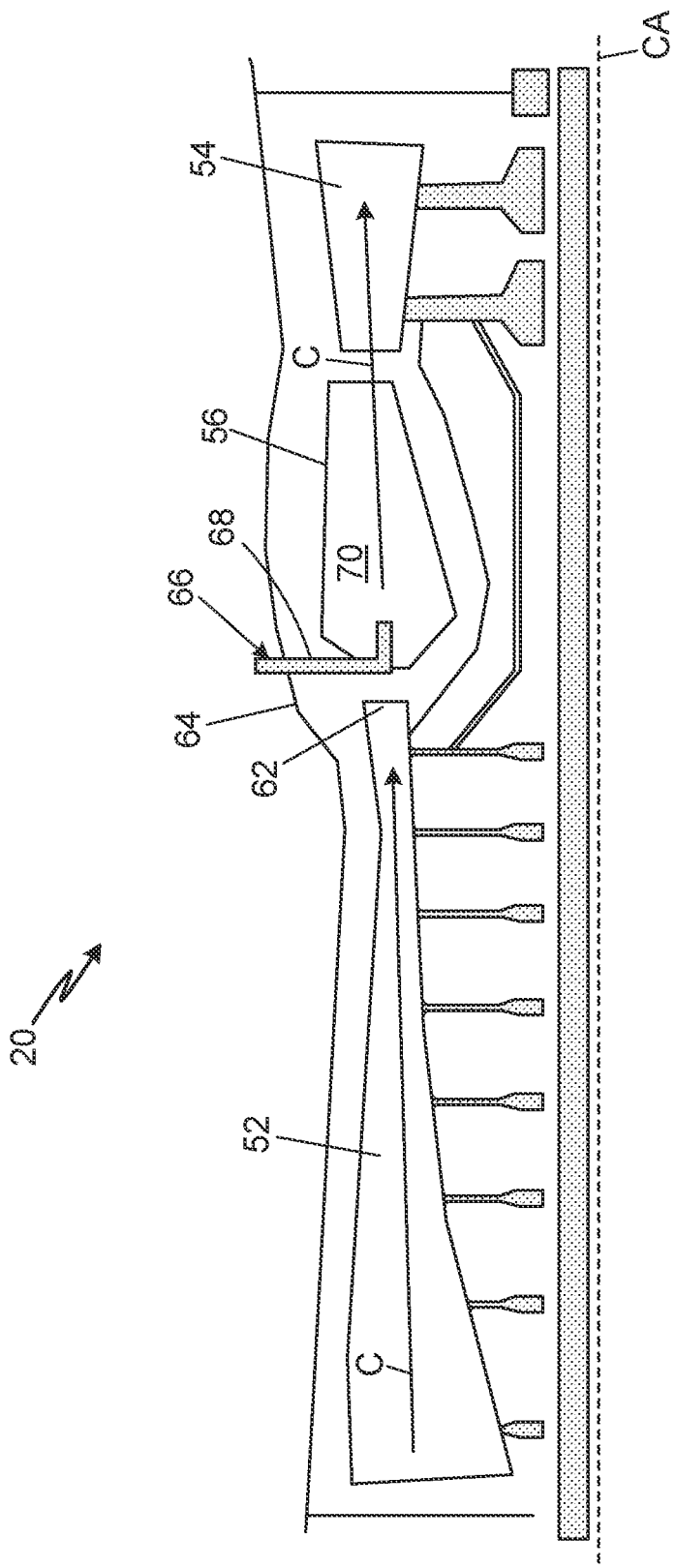
FIG. 2 is a simplified partial cross-sectional view of a high pressure compressor section, combustor, and high pressure turbine section of the gas turbine engine of FIG. 1.

FIG. 2 is a simplified partial cross-sectional view of a high pressure compressor 52, combustor 56, and high pressure turbine section 54 of gas turbine engine 20 of FIG. 1. In the example of FIG. 2, gas turbine engine 20 further includes diffuser 62, diffuser case 64, and fuel system 66. Fuel system 66 includes a plurality of fuel injectors 68 (only one of which is shown in FIG. 2) and combustor 56 include combustion chamber 70.

As discussed above, combustor 56 is positioned in core flowpath C between high pressure compressor 52 and high pressure turbine section 54. Diffuser case 64 can be a portion of core casing 25 that extends around diffuser 62. Diffuser 62 is disposed radially within diffuser case 64 relative to center axis CA and is immediately upstream from combustor 56 relative to the gas flow in core flowpath C. Diffuser 62 is configured to slow the velocity of the gas flow in core flowpath C before the gas flow enters combustion chamber 70. Each of fuel injectors 68 extends through diffuser case 64 and includes a nozzle that delivers fuel into combustion chamber 70.

During operation of gas turbine engine 20, the gas flow in core flowpath is compressed by low pressure compressor 44 (shown in FIG. 1) and by high pressure compressor 52. After the gas flow in core flowpath C is compressed by high pressure compressor 52, the gas flow then enters diffuser 62 where the gas flow decreases in velocity prior to entering combustion chamber 70 of combustor 56. Upon entering combustion chamber 70, the gas flow is mixed with fuel injected into combustion chamber 70 by fuel injectors 68. The gas flow and fuel mixture is then ignited in combustion chamber 70 to produce high pressure exhaust gases that are then expanded through high pressure turbine section 54 and low pressure turbine 46 (shown in FIG. 1). As the fuel flows to and through fuel injectors 68 during operation of gas turbine engine 20, the flow of the fuel helps cool fuel system 66 and prevent coking of the fuel in fuel system 66.

After shutdown of gas turbine engine 20, residual heat in combustor 56, core casing 25, high pressure compressor 52 and high pressure turbine section 54 has the potential to cause heat soak-back in gas turbine engine 20. Heat soak-back occurs in gas turbine engines after shutdown when heat accumulated in hot parts and cavities of a gas turbine engine is transmitted to cooler parts. To protect fuel system 66 from heat soak-back after shutdown of gas turbine engine 20, fuel system 66 can continue to flow and circulate fuel through fuel injectors 68 without injecting the fuel into combustion chamber 70 to cool fuel system 66, as discussed below with reference to FIGS. 3-11.

Figure 3:
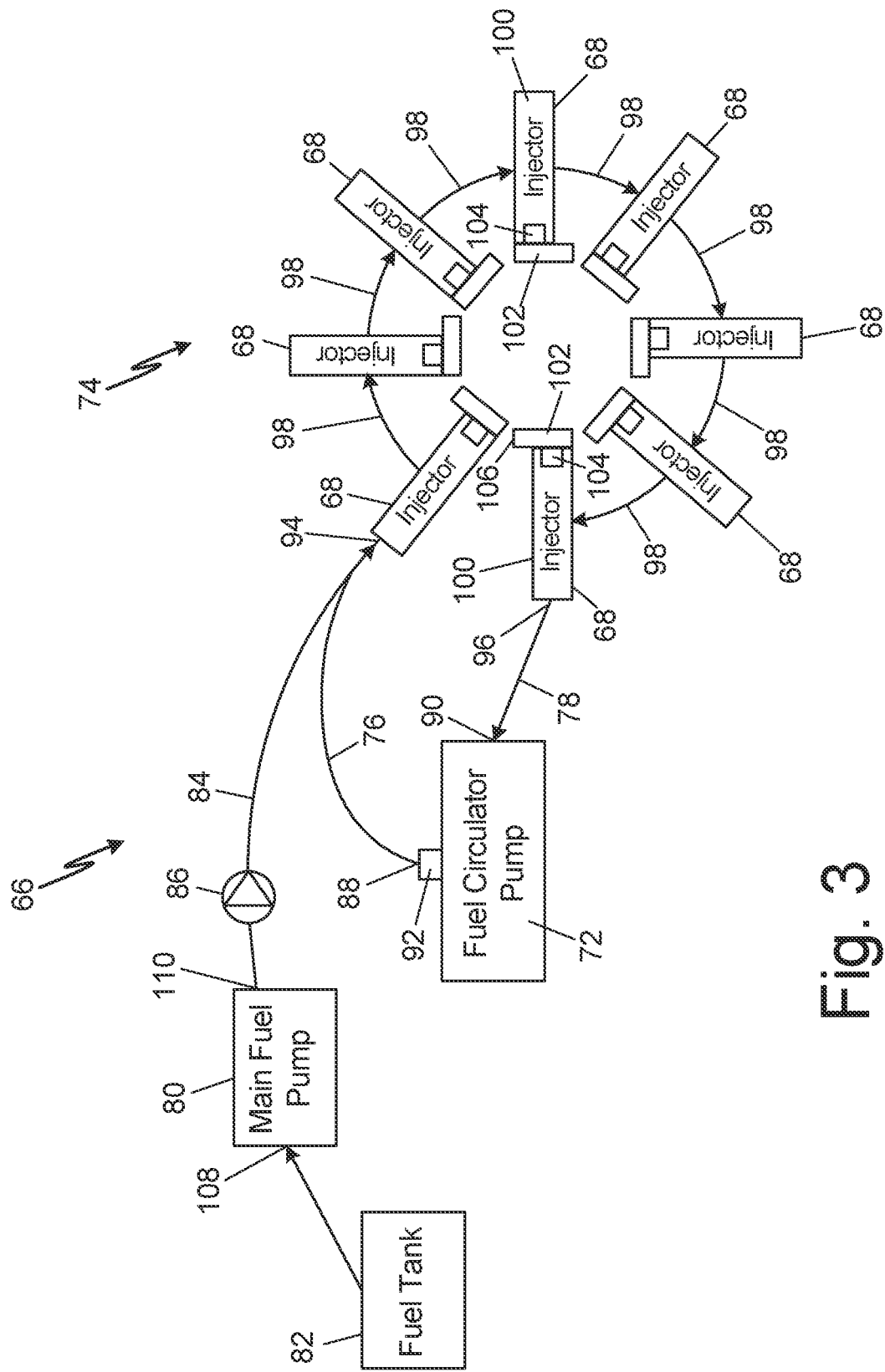
FIG. 3 is a schematic illustration of a fuel system with a fuel circulator pump and a return line for circulating fuel through an array of fuel injectors post shutdown of the gas turbine engine of FIG. 1.

FIG. 3 is a schematic illustration of an example of fuel system 66 with fuel circulator pump 72. In addition to fuel circulator pump 72, fuel system 66 can also include manifold assembly 74, fuel supply line 76, fuel return line 78, main fuel pump 80, fuel tank 82, main pump line 84, and check valve 86. In the example of FIG. 3, fuel circulator pump 72 includes pump outlet 88, pump inlet 90, and shut off valve 92. Manifold assembly 74 includes assembly inlet 94, assembly outlet 96, fuel injectors 68, and fuel manifolds 98. Each fuel injector 68 includes strut 100, nozzle head 102, and nozzle exit 106. Main fuel pump 80 includes main pump inlet 108 and main pump outlet 110.

Fuel injectors 68 are arrayed and circumferentially spaced apart from one another about center axis CA (shown in FIGS. 1 and 2) of gas turbine engine 20. Fuel manifolds 98 each include tubing and fittings that allow fuel manifolds 98 to fluidically connect to plumbing (not shown) of struts 100 of fuel injectors 68. Fuel manifolds 98 fluidically connect to fuel injectors 68 such that fuel manifolds 98 and fuel injectors 68 form a flow path that fluidically connects assembly inlet 94 to assembly outlet 96. Nozzle head 102 of each fuel injector 68 is connected to strut 100 for physical support and to receive fuel from the plumbing of strut 100. Nozzle exit 106 is formed on an end of nozzle head 102 so that fuel can be sprayed from nozzle head 102 into combustion chamber 70 (shown in FIG. 2). Internal valve 104 is inside strut 100 and/or nozzle head 102 and is configured to fluidically connect and disconnect nozzle exit 106 from the plumbing of strut 100.

Fuel supply line 76 fluidically connects pump outlet 88 of fuel circulator pump 72 to assembly inlet 94 of manifold assembly 74. In the example of FIG. 3, fuel return line 78 fluidically connects assembly outlet 96 of manifold assembly 74 to pump inlet 90 of fuel circulator pump 72. Shut off valve 92 can be housed within fuel circulator pump 72 or can be fluidically adjacent to fuel circulator pump 72 (i.e., immediately upstream or downstream from fuel circulator pump 72). Shut off valve 92 is configured to open and close pump outlet 88 and/or pump inlet 90. Shut off valve 92 is open when fuel circulator pump 72 is powered and active. Shut off valve 92 is closed when fuel circulator pump 72 is inactive. Activation, deactivation, and control of fuel circulator pump 72 and shut off valve 92 can be controlled by an electronic engine control (EEC), which is not shown. Fuel circulator pump 72 can be powered by an onboard battery bank or some other power source that does not require gas turbine engine 20 to be powered up.

Fuel tank 82 is fluidically connected to main pump inlet 108. Main pump line 84 is a fuel line that provides a fluid pathway from main pump outlet 110 of main fuel pump 80 to assembly inlet 94. Check valve 86 is connected to main pump line 84 and is positioned fluidically between main pump outlet 110 and assembly inlet 94. When check valve 86 is open, assembly inlet 94 is fluidically connected to main pump outlet 110 and can receive fuel from main fuel pump 80. Check valve 86 opens when main fuel pump 80 is active and pumping fuel from fuel tank 82 to manifold assembly 74. Check valve 86 is closed when main fuel pump 80 is inactive and while fuel circulator pump 72 is powered and actively circulating fuel through manifold assembly 74. Activation, deactivation, and control of main fuel pump 80 can be controlled by the electronic engine control (EEC), which is not shown.

In the example of FIG. 3, when gas turbine engine 20 is in operation, main fuel pump 80 is active and supplying fuel to manifold assembly 74 while fuel circulator pump 72 is inactive and shut off valve 92 is closed. Main fuel pump 80 pulls fuel from fuel tank 82 into main pump inlet 108 and pushes the fuel through main pump outlet 110 into main pump line 84. The pressure of the fuel flowing in main pump line 84 from main fuel pump 80 opens check valve 86. The fuel passes through check valve 86 and continues through main pump line 84 to assembly inlet 94 of manifold assembly 74. The fuel enters manifold assembly 74 through assembly inlet 94 and flows through fuel manifolds 98 to each fuel injector 68. The fuel enters each fuel injector 68 through the plumbing of strut 100. During operation of gas turbine engine 20, internal valve 104 is open such that the fuel can enter nozzle head 102 from strut 100 and can pass through nozzle exit 106 into combustion chamber 70 of combustor 56 (shown in FIG. 2) to be mixed with air and ignited.

While gas turbine engine 20 and main fuel pump 80 are active, fuel circulator pump 72 is inactive and shut off valve 92 is closed to prevent fuel form flowing through fuel circulator pump 72. During active operation of gas turbine engine 20 and main fuel pump 80, flow of the fuel into manifold assembly 74 and out of nozzle exits 106 cools manifold assembly 74 sufficiently to prevent the fuel inside of manifold assembly 74 from coking and clogging fuel system 66.

Immediately after gas turbine engine 20 shuts down, main fuel pump 80 is deactivated, internal valves 104 of fuel injectors 68 are closed, shut off valve 92 opens, and fuel circulator pump 72 is activated. Fuel circulator pump 72 circulates the fuel in manifold assembly 74 immediately after shutdown of gas turbine engine 20 to help cool manifold assembly 74 and prevent coking within fuel system 66. Fuel circulator pump 72 circulates the fuel in manifold assembly 74 by flowing fuel from assembly outlet 96, through pump inlet 90, through shut off valve 92, through pump outlet 88, through fuel supply line 76, and into assembly inlet 94. After passing through assembly inlet 94, fuel circulator pump 72 causes the fuel to flow through each of fuel manifolds 98 and each of fuel injectors 68. As the fuel flows through each of fuel injectors 68, the fuel flows radially inward (relative to center axis CA shown in FIGS. 1 and 2) through strut 100 to nozzle head 102. Since internal valve 104 is closed, the fuel does not flow out of nozzle head 102 through nozzle exit 106. Rather, the fuel makes a turn within fuel injector 68 and flows radially outward from nozzle head 102 through strut 100 to one of fuel manifolds 98.

After flowing through fuel manifolds 98 and fuel injectors 68, the fuel exits manifold assembly 74 through assembly outlet 96. From assembly outlet 96, the fuel passes through fuel return line 78 to return to pump inlet 90 of fuel circulator pump 72 to begin another pass through the fuel circuit formed by fuel circulator pump 72, fuel supply line 76, manifold assembly 74, and fuel return line 78. While fuel circulator pump 72 is active and main fuel pump 80 is inactive, the pressure of the fuel generated by fuel circulator pump 72 causes check valve 86 to close. Closure of check valve 86 prevents the fuel circulated by fuel circulator pump 72 from back flowing through main fuel pump 80 and escaping the fuel circuit formed by fuel circulator pump 72, fuel supply line 76, manifold assembly 74, and fuel return line 78.

Fuel circulator pump 72 continues to circulate the fuel through manifold assembly 74 until gas turbine engine 20 has sufficiently cooled down to a temperature that is too low to cause coking in fuel system 66. At this point where gas turbine engine 20 has sufficiently cooled and there is insufficient heat in gas turbine engine 20 to cause coking in fuel system 66, fuel circulator pump 72 can be deactivated and shut off valve 92 closed. Alternatively, fuel circulator pump 72 may circulate fuel through manifold assembly 74 on an intermittent basis until gas turbine 20 has sufficiently cooled down to a temperature that is too low to cause coking in fuel system 66. Fuel circulator pump 72 may be scheduled to run for a set duration and a set interval or may be scheduled to reduce the duty cycle as gas turbine 20 cools and the risk of fuel coking in fuel system 55 decreases. Internal valves 104 in fuel injectors 68 can remain closed to prevent fuel from leaking out of fuel injectors 68 until the next startup of gas turbine engine 20. Protecting fuel system 66 against coking helps keep passages, fuel filters, fueldraulics, and heat exchangers within fuel system 66 clear so that combustor 56 receives a steady supply of fuel during engine operation.

Reducing or eliminating coking in fuel system 66 also reduces maintenance time and cost on fuel system 66 and gas turbine engine 20. Fuel circulator pump 72 can also be activated intermittently during operation of gas turbine engine 20 to circulate fuel through manifold assembly 74 to prevent coking within fuel supply line 76 and fuel return line 78.

Figure 4:
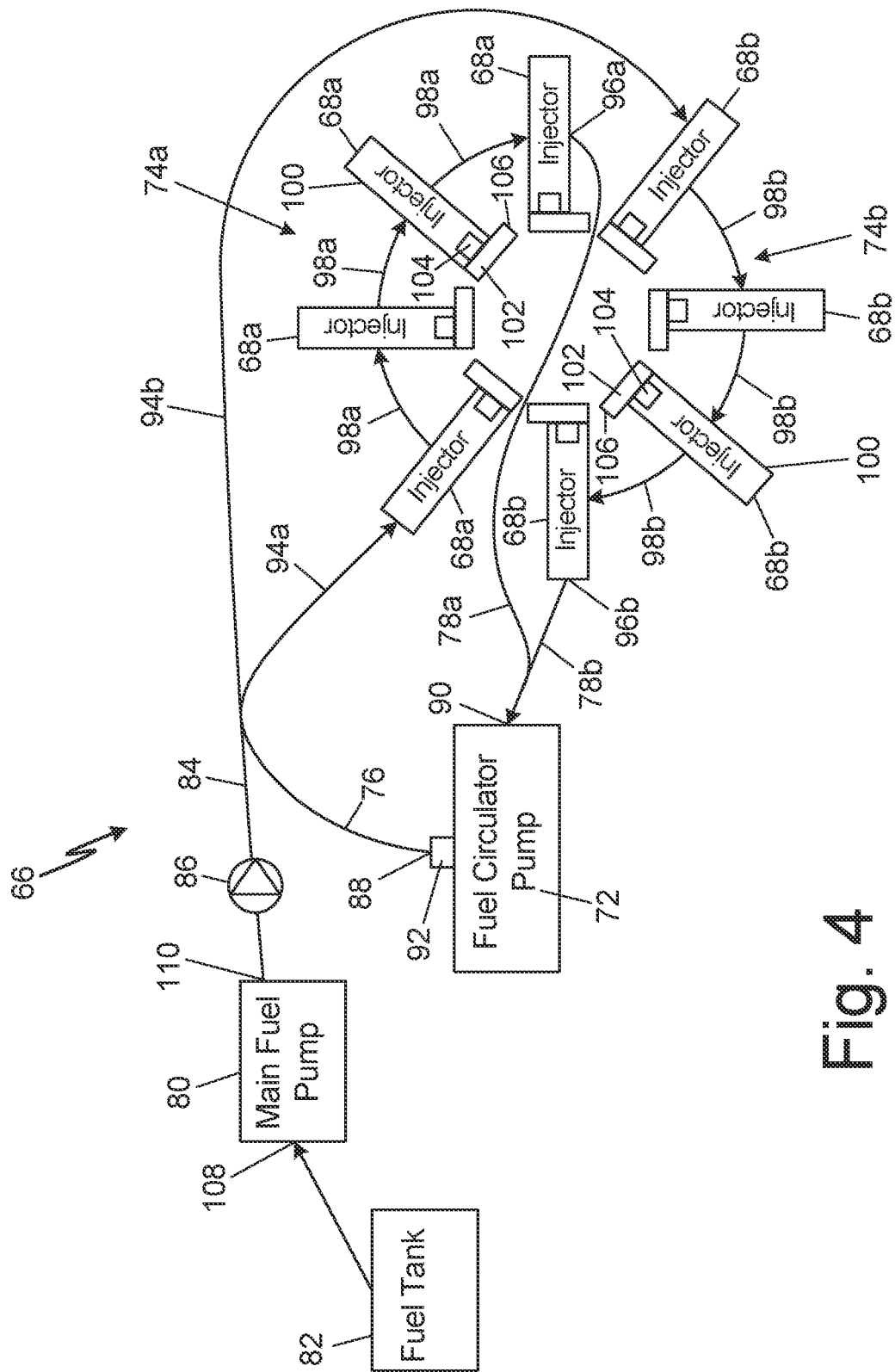
FIG. 4 is a schematic illustration of another example of a fuel system with a fuel circulator pump and at least one return line for circulating fuel through an array of fuel injectors post shutdown of the gas turbine engine of FIG. 1.

FIG. 4 is a schematic illustration of another example of fuel system 66 with first manifold assembly 74a and second manifold assembly 74b fluidically connected in parallel with fuel circulator pump 72. In addition to fuel circulator pump 72, first manifold assembly 74a, and second manifold assembly 74b, the example of fuel system 66 shown in FIG. 4 can also include fuel supply line 76, first fuel return line 78a, second fuel return line 78b, main fuel pump 80, fuel tank 82, main pump line 84, and check valve 86. Fuel circulator pump 72 includes pump outlet 88, pump inlet 90, and shut off valve 92. First manifold assembly 74a includes assembly inlet 94a, assembly outlet 96a, fuel injectors 68a, and fuel manifolds 98a. Second manifold assembly 74b includes assembly inlet 94b, assembly outlet 96b, fuel injectors 68b, and fuel manifolds 98b. Each of fuel injectors 68a and fuel injectors 68b includes strut 100, nozzle head 102, and nozzle exit 106. Main fuel pump 80 includes main pump inlet 108 and main pump outlet 110. The example of fuel system 66 of FIG. 4 is similar to the example of fuel system 66 of FIG. 3. Thus, components of the example of fuel system 66 shown in FIG. 4 and components of the example of fuel system 66 shown in FIG. 3 that share like reference numerals also share similar structure and function.

In the example of FIG. 4, fuel circulator pump 72, fuel supply line 76, first manifold assembly 74a, second manifold assembly 74b, first fuel return line 78a, and second fuel return line 78b form a closed flow circuit when main fuel pump 80 is inactive and fuel circulator pump 72 is active. First manifold assembly 74a forms a first leg of the closed flow circuit and second manifold assembly 74b forms a second leg of the closed flow circuit that is fluidically in parallel to first manifold assembly 74a.

Fuel injectors 68a and fuel injectors 68b are arrayed and circumferentially spaced apart from one another about center axis CA (shown in FIGS. 1 and 2) of gas turbine engine 20. Both fuel injectors 68a and fuel injectors 68b shown in FIG. 4 are similar to fuel injectors 68 described above with reference to FIG. 3. Thus, the description above of fuel injectors 68 also applies to fuel injectors 68a and fuel injectors 68b. Fuel manifolds 98a fluidically connect to fuel injectors 68a such that fuel manifolds 98a and fuel injectors 68a form a flow path that fluidically connects assembly inlet 94a to assembly outlet 96a. Fuel manifolds 98b fluidically connect to fuel injectors 68b such that fuel manifolds 98b and fuel injectors 68b form a flow path that fluidically connects assembly inlet 94b to assembly outlet 96b.

Fuel supply line 76 fluidically connects pump outlet 88 of fuel circulator pump 72 to assembly inlet 94a of first manifold assembly 74a and to assembly inlet 94b of second manifold assembly 74b. In the example of FIG. 4, first fuel return line 78a fluidically connects assembly outlet 96a of first manifold assembly 74a to pump inlet 90 of fuel circulator pump 72. Second fuel return line 78b fluidically connects assembly outlet 96b of second manifold assembly 74b to pump inlet 90 of fuel circulator pump 72.

Main pump line 84 is a fuel line that provides a fluid pathway from main pump outlet 110 of main fuel pump 80 to both assembly inlet 94a of first manifold assembly 74a and assembly inlet 94b of second manifold assembly 74b. Check valve 86 is connected to main pump line 84 and is positioned fluidically between main pump outlet 110 and both assembly inlet 94a and assembly inlet 94b. When check valve 86 is open, assembly inlets 94a and 94b are fluidically connected to main pump outlet 110 and can receive fuel from main fuel pump 80. Check valve 86 opens when main fuel pump 80 is active and pumping fuel from fuel tank 82 to first manifold assembly 74a and second manifold assembly 74b.

In the example of FIG. 4, when gas turbine engine 20 is in operation, main fuel pump 80 is active and supplying fuel to first manifold assembly 74a and second manifold assembly 74b while fuel circulator pump 72 is inactive and shut off valve 92 is closed. Main fuel pump 80 pulls fuel from fuel tank 82 into main pump inlet 108 and pushes the fuel through main pump outlet 110 into main pump line 84. The pressure of the fuel flowing in main pump line 84 from main fuel pump 80 opens check valve 86. The fuel passes through check valve 86 and continues through main pump line 84. A first portion of the fuel in main pump line 84 is directed to assembly inlet 94a of first manifold assembly 74a. A second portion of the fuel in main pump line 84 is directed to assembly inlet 94b of second manifold assembly 74b.

The first portion of the fuel enters first manifold assembly 74a through assembly inlet 94a and flows through fuel manifolds 98a to each fuel injector 68a. The first portion of the fuel enters each fuel injector 68a through the plumbing of strut 100. During operation of gas turbine engine 20, internal valve 104 is open such that the fuel can enter nozzle head 102 from strut 100 and can pass through nozzle exit 106 into combustion chamber 70 of combustor 56 (shown in FIG. 2) to be mixed with air and ignited. In similar fashion, the second portion of the fuel enters second manifold assembly 74b through assembly inlet 94b and flows through fuel manifolds 98b to each fuel injector 68b. The second portion of the fuel enters each fuel injector 68b through the plumbing of strut 100. During operation of gas turbine engine 20, internal valve 104 is open such that the fuel can enter nozzle head 102 from strut 100 and can pass through nozzle exit 106 into combustion chamber 70 of combustor 56 (shown in FIG. 2) to be mixed with air and ignited.

While gas turbine engine 20 and main fuel pump 80 are active, fuel circulator pump 72 is inactive and shut off valve 92 is closed to prevent fuel form flowing through fuel circulator pump 72. During active operation of gas turbine engine 20 and main fuel pump 80, flow of the first portion of the fuel into first manifold assembly 74a and out of nozzle exits 106 of fuel injectors 68a cools first manifold assembly 74a. Flow of the second portion of the fuel into second manifold assembly 74b and out of nozzle exits 106 of fuel injectors 68b cools second manifold assembly 74b.

Immediately after gas turbine engine 20 shuts down, main fuel pump 80 is deactivated, internal valves 104 of fuel injectors 68a and internal valves 104 of fuel injectors 68b are closed, shut off valve 92 opens, and fuel circulator pump 72 is activated. Fuel circulator pump 72 circulates the fuel in first manifold assembly 74a and second manifold assembly 74b immediately after shutdown of gas turbine engine 20 to help cool first manifold assembly 74a and cool second manifold assembly 74b and prevent coking within fuel system 66. Fuel circulator pump 72 circulates the fuel in first manifold assembly 74a and second manifold 74b by flowing fuel from both assembly outlet 96a of first manifold assembly 74a and assembly outlet 96b of second manifold 74b through pump inlet 90. The fuel then passes through shut off valve 92, through pump outlet 88, and through fuel supply line 76. The fuel then passes from fuel supply line 76 to assembly inlet 94a of first manifold assembly 74a and assembly inlet 94b of second manifold assembly 74b. The fuel is then divided between first manifold assembly 74a and second manifold assembly 74b. The fuel passes through first manifold assembly 74a and second manifold assembly 74b in similar fashion as manifold assembly 74 described above with reference to FIG. 3.

After flowing through first manifold assembly 74a and second manifold assembly 74b, the fuel exits first manifold assembly 74a through assembly outlet 96a and exits second manifold assembly 74b through assembly outlet 96b. From assembly outlets 96a and 96b, the fuel passes through first fuel return line 78a and second fuel return line 78b to return to pump inlet 90 of fuel circulator pump 72 to begin another pass through the fuel circuit formed by fuel circulator pump 72, fuel supply line 76, first manifold assembly 74a, second manifold assembly 74b, first fuel return line 78a, and second fuel return line 78b. While fuel circulator pump 72 is active and main fuel pump 80 is inactive, the pressure of the fuel generated by fuel circulator pump 72 causes check valve 86 to close. Closure of check valve 86 prevents the fuel circulated by fuel circulator pump 72 from back flowing through main fuel pump 80 and escaping the fuel circuit formed by fuel circulator pump 72, fuel supply line 76, first manifold assembly 74a, second manifold assembly 74b, first fuel return line 78a, and second fuel return line 78b.

Fuel circulator pump 72 continues to circulate the fuel through first manifold assembly 74a and second manifold assembly 74b until gas turbine engine 20 has sufficiently cooled down to a temperature that is too low to cause coking in fuel system 66. At this point where gas turbine engine 20 has sufficiently cooled and there is insufficient heat in gas turbine engine 20 to cause coking in fuel system 66, fuel circulator pump 72 can be deactivated and shut off valve 92 closed. Internal valves 104 in fuel injectors 68a and 68b can remain closed to prevent fuel from leaking out of fuel injectors 68a and 68b until the next startup of gas turbine engine 20. Protecting fuel system 66 against coking helps keep passages within fuel system 66 clear so that combustor 56 receives a steady and reliable supply of fuel during engine operation. Reducing or eliminating coking in fuel system 66 also reduces maintenance time and cost on fuel system 66 and gas turbine engine 20, which in turn increases the operational availability of gas turbine engine 20.

Figure 5:
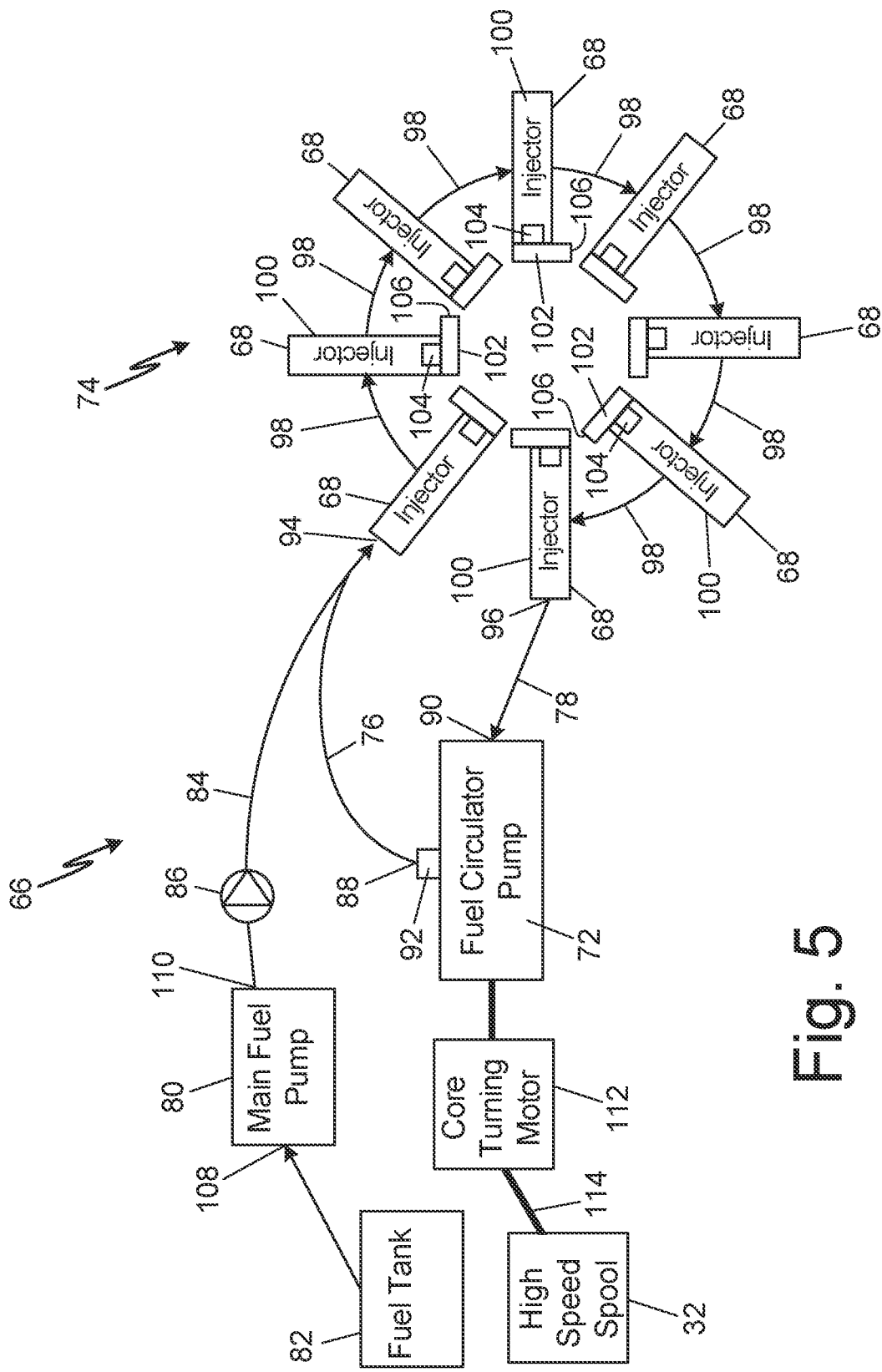
FIG. 5 is a schematic illustration of another example of a fuel system with a fuel circulator pump and a return line for circulating fuel through an array of fuel injectors post shutdown of the gas turbine engine of FIG. 1.

FIG. 5 is a schematic illustration of another example fuel system 66. Fuel system 66 of FIG. 5 is similar to the example of FIG. 3, with the addition of core turning motor 112 and coupling 114. Core turning motor 112 is a motor that rotates inner shaft 40 and/or outer shaft 50 (both shown in FIG. 1) after gas turbine engine 20 is powered down to mitigate bowing of inner shaft 40 and outer shaft 50. Core turning motor 112 and fuel circulator pump 72 can be mechanically connected to each other and connected to low-speed spool 30 or high-speed spool 32, through coupling 114. In the example of FIG. 5, coupling 114 can include a geartrain, clutch, and/or mechanical solenoid. Coupling 114 disengages core turning motor 112 and fuel circulator pump 72 from high speed spool 32 when gas turbine engine 20 is running. When gas turbine engine 20 is shut down and core turning motor 112 and fuel circulator pump 72 is activated, coupling 114 rotationally engages fuel circulator pump 72 with low-speed spool 30 or high-speed spool 32. Thus, activation and powering of fuel circulator pump 72 can be dependent on activation and powering of core turning motor 112. Core turning motor 112 can be housed on gas turbine engine 20, or core turning motor 112 can be part of a ground-based servicing unit that connects to coupling 114 once the aircraft powered by gas turbine engine 20 has landed and parked.

Figure 6:
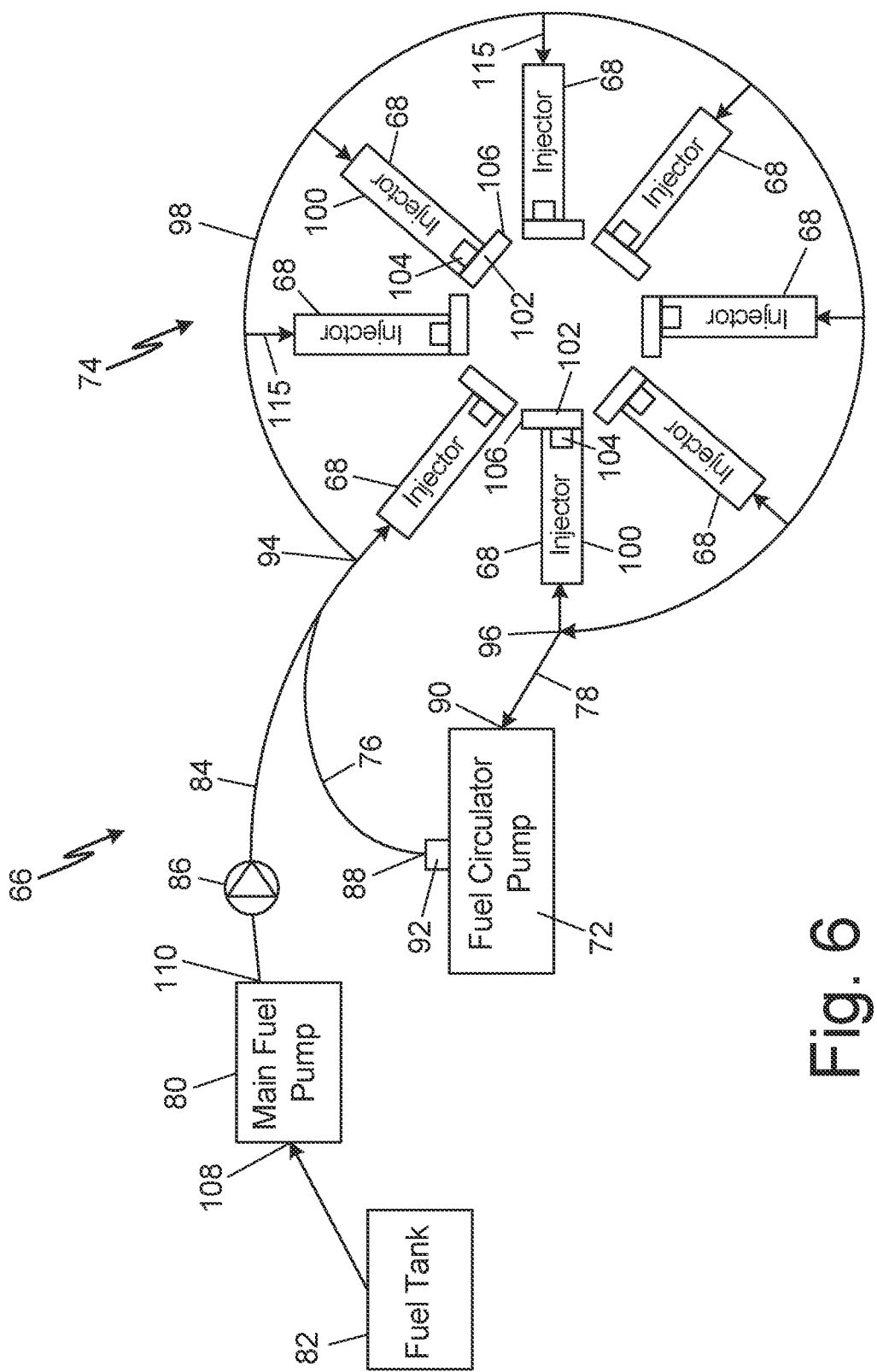
FIG. 6 is a schematic illustration of another example of a fuel system with a fuel circulator pump and a return line for circulating fuel through an array of fuel injectors post shutdown of the gas turbine engine of FIG. 1.

FIG. 6 is a schematic illustration of another example fuel system 66. Fuel system 66 of FIG. 6 is similar to the example of FIG. 3, except a single fuel manifold 98 connects all of fuel injectors 68 to fuel system 66. Fuel manifold 98 in FIG. 6 includes multiple jumper feeds 115 that fluidically connect fuel manifold 98 to fuel injectors 68. In some examples, jumper feeds 115 can include both a supply passage and a return passage such that fuel can circulate through each fuel injector 68 when main fuel pump 80 is deactivated, fuel circulator pump 72 is activated, shut off valve 92 is open, and internal valves 104 are closed.

Figure 7:
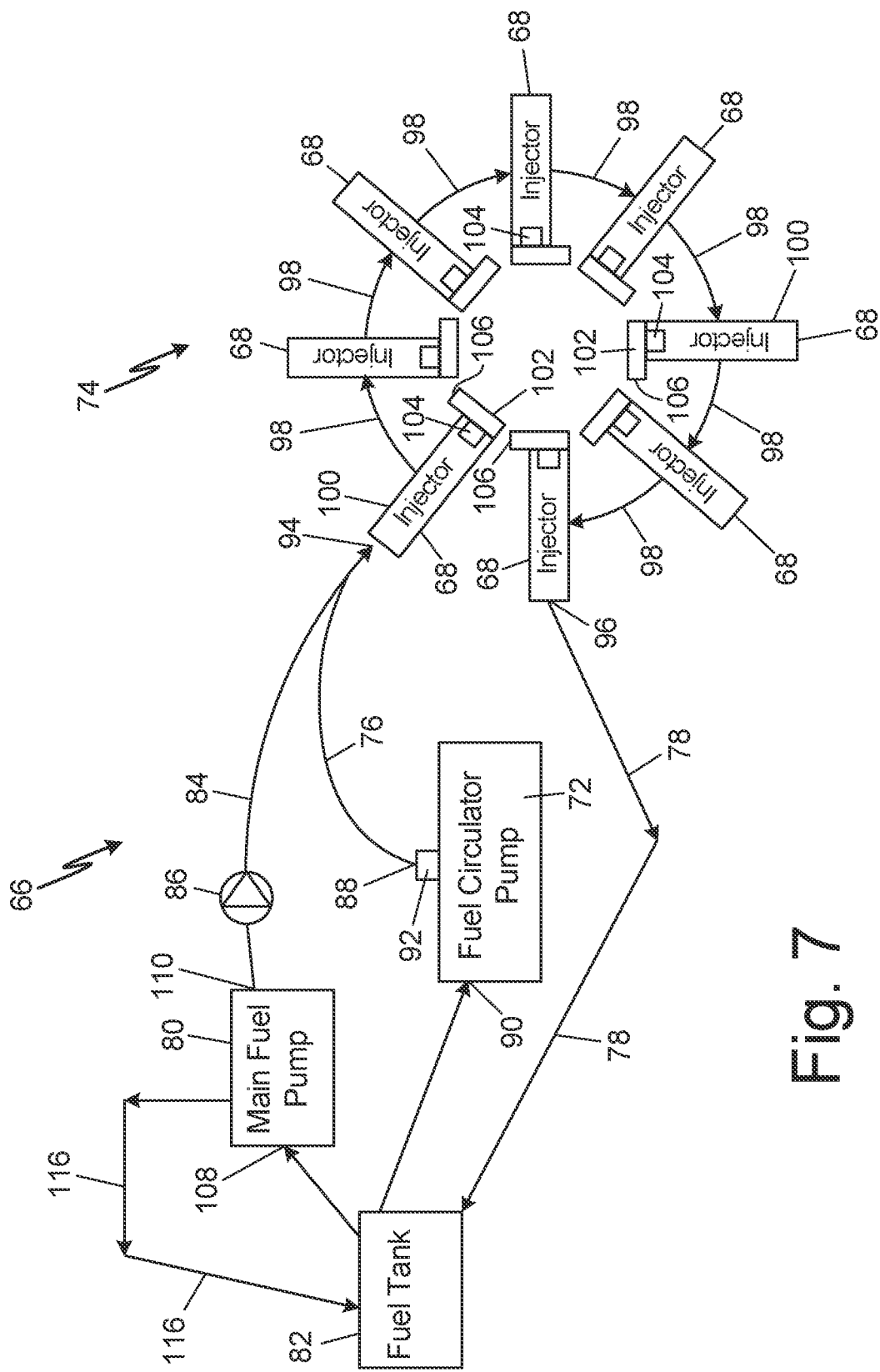
FIG. 7 is a schematic illustration of another example of a fuel system with a fuel circulator pump and a return line for circulating fuel through an array of fuel injectors post shutdown of the gas turbine engine of FIG. 1.

FIG. 7 is a schematic illustration of another example fuel system 66. Fuel system 66 of FIG. 7 is similar to the example of FIG. 3, except pump inlet 90 of fuel circulator pump 72 is fluidically connected to fuel tank 82, fuel return line 78 fluidically connects assembly outlet 96 of manifold assembly 74 to fuel tank 82, and fuel system 66 also includes return loop 116. Return loop 116 can redirect excess fuel from main fuel pump 80 to fuel tank 82 during normal operation. In the example of FIG. 7, fuel circulator pump 72 is circulating fuel from fuel tank 82 through manifold assembly 74, though fuel return line 78 and back to fuel tank 82. By moving fuel through fuel return line 78, fuel circulator pump 90 can help manage the temperature of the fuel in manifold assembly 74 and protect fuel system 66 from coking.

Figure 8:
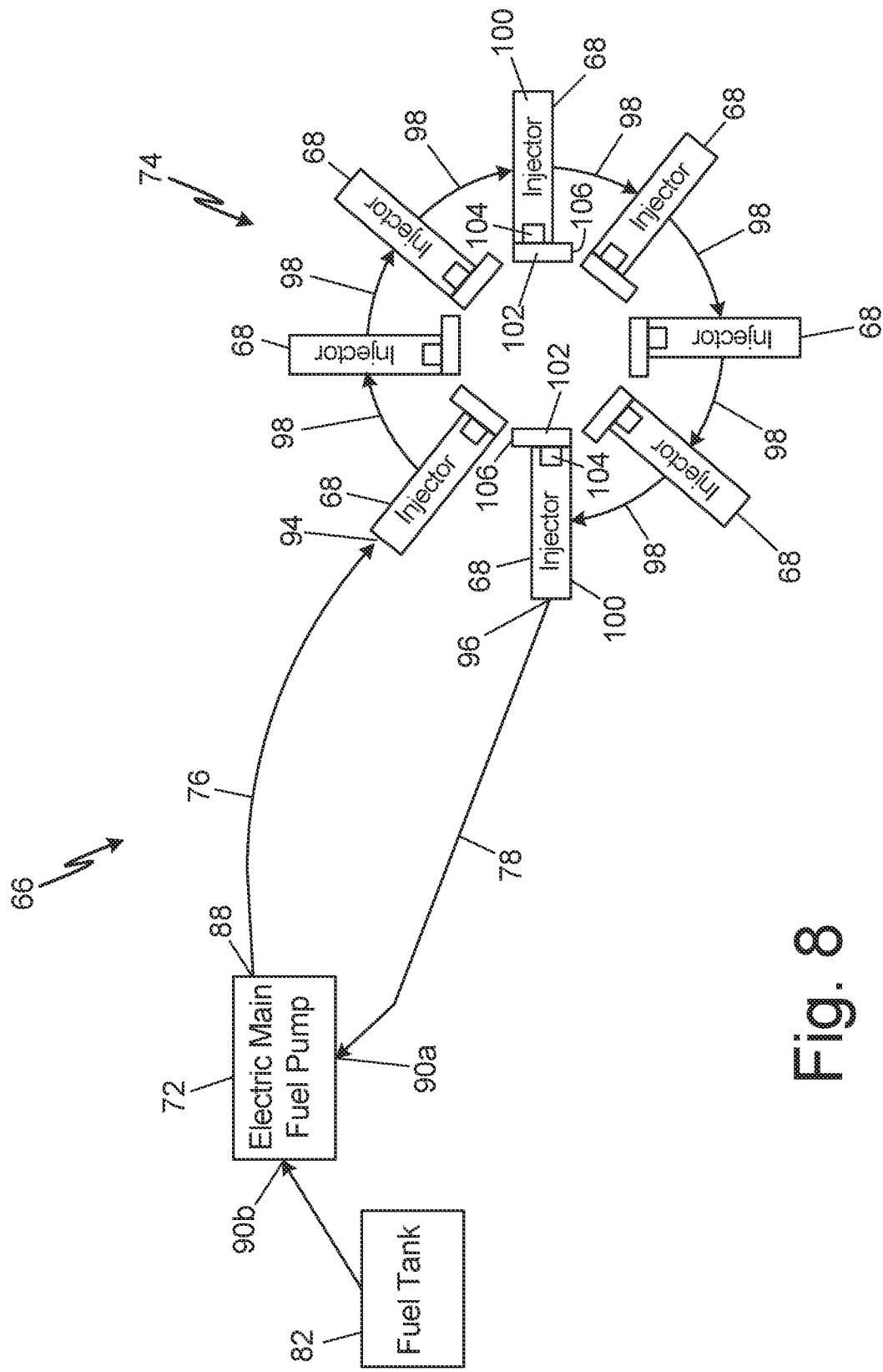
FIG. 8 is a schematic illustration of another example of a fuel system with an electric fuel pump and a return line for circulating fuel through an array of fuel injectors post shutdown of the gas turbine engine of FIG. 1.

FIG. 8 is a schematic illustration of another example of fuel system 66. In the example of FIG. 8, fuel circulator pump 72 is an electric fuel pump that also fulfills the function of main fuel pump 80 from FIG. 3. Fuel circulator pump 72 can include first pump inlet 90a fluidically connected fuel return line 78, and second pump inlet 90b fluidically connected to fuel tank 82. Fuel circulator pump 72 can also include a selector valve (not shown) that can selectively open and close first pump inlet 90a and second pump inlet 90b.

In the example of FIG. 8, during operation of gas turbine engine 20, fuel circulator pump 72 is powered and moves fuel from fuel tank 82 though second pump inlet 90b, through pump outlet 88, and into fuel supply line 76. The fuel travels in fuel supply line 76 to assembly inlet 94 and enters manifold assembly 74. The fuel travels through fuel manifolds 98 to fuel injectors 68. The fuel enters struts 100 of fuel injectors 68, passes through internal valves 104 (which are open during operation of gas turbine engine 20), enters nozzle head 102, and is sprayed from nozzle exit 106 into combustion chamber 70 (shown in FIG. 2). The fuel is mixed with air in combustion chamber 70 and ignited to produce hot exhaust gases. During operation of gas turbine engine 20, the selector valve of fuel circulator pump 72 can close first pump inlet 90a to prevent fuel circulator pump 72 from drawing fuel from manifold assembly 74 through assembly outlet 96 and fuel return line 78.

When gas turbine engine 20 shuts down, internal valves 104 of fuel injectors 68 close to stop fuel from exiting out of fuel injectors 68 through nozzle exits 106. The selector valve of fuel circulator pump 72 can close second pump inlet 90b and open first pump inlet 90a so that fuel circulator pump 72 can draw fuel from assembly outlet 96 though fuel return line 78. Fuel circulator pump 72 then moves the fuel through pump outlet 88, through fuel supply line 76, and back into manifold assembly 74. Thus, fuel circulator pump 72, fuel supply line 76, manifold assembly 74, and fuel return line 78 can form a closed loop for circulating the fuel.

In a variation of the example of FIG. 8, fuel return line 78 can be fluidically connected to fuel tank 82 instead of first pump inlet 90a, such that fuel circulator pump 72 can draw fuel from fuel tank 82 to circulate through manifold assembly 74 post engine shutdown, and the fuel can return to fuel tank 82 after passing through manifold assembly 74.

FIGS. 9A-9C will be discussed concurrently. FIG. 9A is a schematic illustration of an example of fuel injector 68 of fuel system 66 with internal valve 104 in an "on" position. FIG. 9B is a cross-sectional view of strut 100 of fuel injector 68 of FIG. 9A taken along line A-A. FIG. 9C is a schematic illustration of fuel injector 68 from FIG. 9A with internal valve 104 in an "off" position. The example of fuel injector 68 shown in FIGS. 9A-9C can be used by any of the examples of fuel system 66 shown in FIGS. 3-8. In the example of FIGS. 9A-9C, fuel injector 68 further includes supply passage 118 and return passage 120. Internal valve 104 can be an electrically actuated valve that includes actuator 122, drive shaft 124, valve head 126, first valve seat 128, and second valve seat 130.

In the example of FIGS. 9A-9C, first valve seat 128 and second valve seat 130 are in strut 100 proximate to nozzle head 102. In other examples, first valve seat 128 and second valve seat 130 can be in nozzle head 102. Supply passage 118 is a flow passage that extends along strut 100 from a radially outer end of strut 100 (relative to center axis CA) to second valve seat 130. Return passage 120 is a flow passage that extends along strut 100 from the radially outer end of strut 100 to first valve seat 128. Fuel manifolds 98 (shown in FIGS. 3-8) can fluidically connect supply passage 118 to assembly inlet 94 of manifold assembly 74. Fuel manifolds 98 can fluidically connect return passage 120 to assembly outlet 96 of manifold assembly 74 (also shown in FIGS. 3-8).

Valve head 126 is positioned between first valve seat 128 and second valve seat 130. Actuator 122 is positioned outside of diffuser case 64 to protect actuator 122 from the heat within diffuser case 64 generated by combustor 56. Drive shaft 124 extends from actuator 122 through strut 100 to valve head 126. Drive shaft 124 connects valve head 126 to actuator 122 such that actuator 122 can move valve head 126 between first valve seat 128 and second valve seat 130. Actuator 122 can be an electrical motor, such as servo motor, that is controlled by the electronic engine control (EEC) to move valve head 126 from first valve seat 128 to second valve seat 130 and vice versa via drive shaft 124.

When gas turbine engine 20 is on, actuator 122 can position valve head 126 against first valve seat 128 to close first valve seat 128 and fluidically disconnect return passage 120 from supply passage 118. With valve head 126 against first valve seat 128, second valve seat 130 is open and supply passage 118 is fluidically connected to nozzle head 102 and nozzle exit 106. With supply passage 118 fluidically connected to nozzle exit 106, fuel can travel through strut 100, through nozzle head 102, and through nozzle exit 106 to be mixed with air in combustion chamber 70 (shown in FIG. 2) and ignited.

When gas turbine engine 20 is off, or is turning off, actuator 122 can position valve head 126 against second valve seat 130 to close second valve seat 130 and fluidically disconnect supply passage 118 from nozzle exit 106. With valve head 126 against second valve seat 130, first valve seat 128 is open and supply passage 118 is fluidically connected to return passage 120. With supply passage 118 fluidically connected to return passage 120, fuel circulator pump 72 (shown in FIGS. 3-8) can cause the fuel to circulate through fuel injector 68 by passing the fuel radially downward through supply passage 118, turning the fuel at internal valve 104, and passing the fuel radially upward through return passage 120. After passing through return passage 120, the fuel continues through manifold assembly 74, eventually exits manifold assembly 74 though assembly outlet 96, and passes through fuel return line 78, as discussed above with reference to FIGS. 3-8. While FIGS. 9A-9C show internal valve 104 as an electrically actuated valve, internal valve 104 can also be a pressure release valve, as discussed below with reference to FIGS. 10A-10C.

Figures 10A, 10B, 10C:
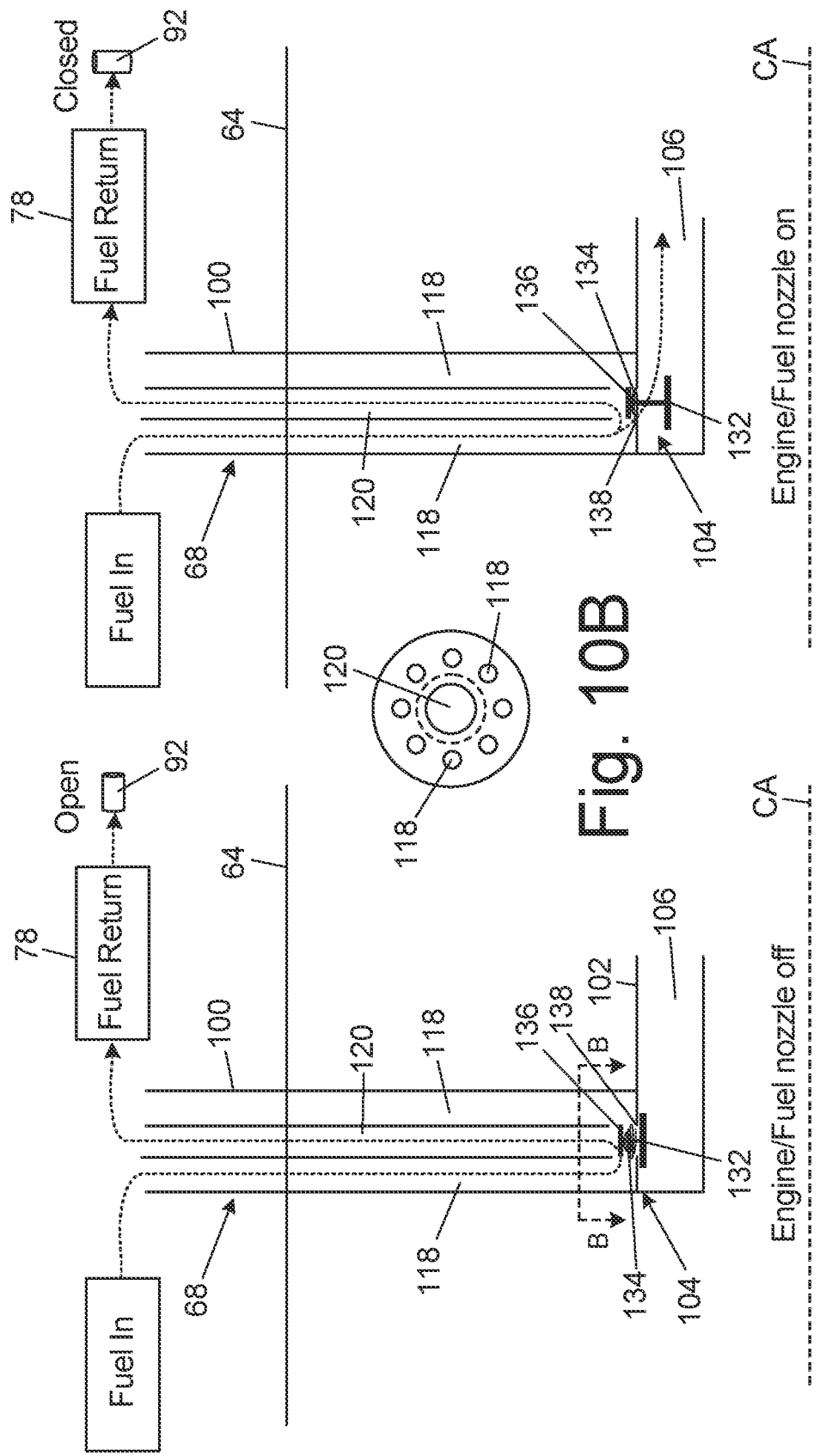
FIG. 10A is a schematic illustration of a fuel injector of the fuel system of any of FIGS. 3-8 with an internal valve in a closed position, a return line, and a shut-off valve in an open position.
FIG. 10B is a cross-sectional view of a strut of the fuel injector of FIG. 10A taken along line B-B.
FIG. 10C is a schematic illustration of the fuel injector of FIG. 10A with the internal valve in an open position and the shut-off valve in a closed position.

FIGS. 10A-10C will be discussed concurrently. FIG. 10A is a schematic illustration of an example of fuel injector 68 of fuel system 66 with internal valve 104 in a closed position. FIG. 10B is a cross-sectional view of strut 100 of fuel injector 68 of FIG. 10A taken along line B-B. FIG. 10C is a schematic illustration of fuel injector 68 from FIG. 10A with internal valve 104 in an open position. The example of fuel injector 68 shown in FIGS. 10A-10C can be used by any of the examples of fuel system 66 shown in FIGS. 3-8. In the example of FIGS. 10A-10C, internal valve 104 can be a pressure release valve that includes valve head 132, spring 134, piston 136, and valve seat 138.

Valve seat 138 is in strut 100 proximate to nozzle head 102 and includes an opening that fluidically connects supply passage 118 to nozzle head 102. In other examples, valve seat 138 can be in nozzle head 102. Supply passage 118 is a flow passage that extends along strut 100 from a radially outer end of strut 100 (relative to center axis CA) to valve seat 138. Return passage 120 is a flow passage that extends along strut 100 from the radially outer end of strut 100 toward valve seat 138. In the example of FIGS. 10A-10C, return passage 120 fluidically connects with supply passage 118 just above internal valve 104 relative to center axis CA and forms a continuous passage with supply passage 118. Fuel manifolds 98 (shown in FIGS. 3-8) can fluidically connect supply passage 118 to assembly inlet 94 of manifold assembly 74. Fuel manifolds 98 can fluidically connect return passage 120 to assembly outlet 96 of manifold assembly 74 (also shown in FIGS. 3-8).

Piston 136 is positioned on a first side of valve seat 138 and valve head 132 is positioned on a second side of valve seat 138. A stem or connector can extend through valve seat 138 to connect piston 136 to valve head 132. Spring 134 is positioned between piston 136 and valve head 132 and biases valve head 132 to a closed position against valve seat 138. When in the closed position valve head 132 closes valve seat 138 and blocks fuel from entering nozzle head 102 and passing through nozzle exit 106.

FIG. 10C shows fuel injector 68 when gas turbine engine 20 is on. When gas turbine engine 20 is on, shut off valve 92 of circulator pump 72 is closed such that fuel cannot exit though assembly outlet 96 (shown in FIGS. 3-8). The pressure of the fuel entering fuel injector 68 and the back pressure caused by shut off valve 92 being closed pushes on piston 136 and overcomes the biasing force of spring 134 to compress spring 134 and push valve head 132 away from valve seat 138. As the fuel pushes valve head 132 away from valve seat 138, valve seat 138 opens to fluidically connect supply passage 118 to nozzle head 102 and nozzle exit 106. With supply passage 118 fluidically connected to nozzle exit 106, fuel can travel through strut 100, through nozzle head 102, and through nozzle exit 106 to be mixed with air in combustion chamber 70 (shown in FIG. 2) and ignited.

FIG. 10A shows fuel injector 68 when gas turbine engine 20 is off or turning off. When gas turbine engine 20 is off, or is turning off, shut off valve 92 of circulator pump 72 is opened such that fuel can exit manifold assembly 74 though assembly outlet 96 (shown in FIGS. 3-8). With shut off valve 92 open, the hydraulic pressure of the fuel within supply passage 118 and return passage 120 drops and the biasing force of spring 134 forces valve head 132 against valve seat 138 to close valve seat 138 and fluidically disconnect supply passage 118 and return passage 120 from nozzle exit 106. With valve seat 138 closed and shut off valve 92 open, fuel circulator pump 72 (shown in FIGS. 3-8) can cause the fuel to circulate through fuel injector 68 by passing the fuel radially downward through supply passage 118, turning the fuel near internal valve 104, and passing the fuel radially upward through return passage 120. After passing through return passage 120, the fuel continues through manifold assembly 74, eventually exits manifold assembly 74 though assembly outlet 96, and passes through fuel return line 78, as discussed above with reference to FIGS. 3-8.

Figure 11:
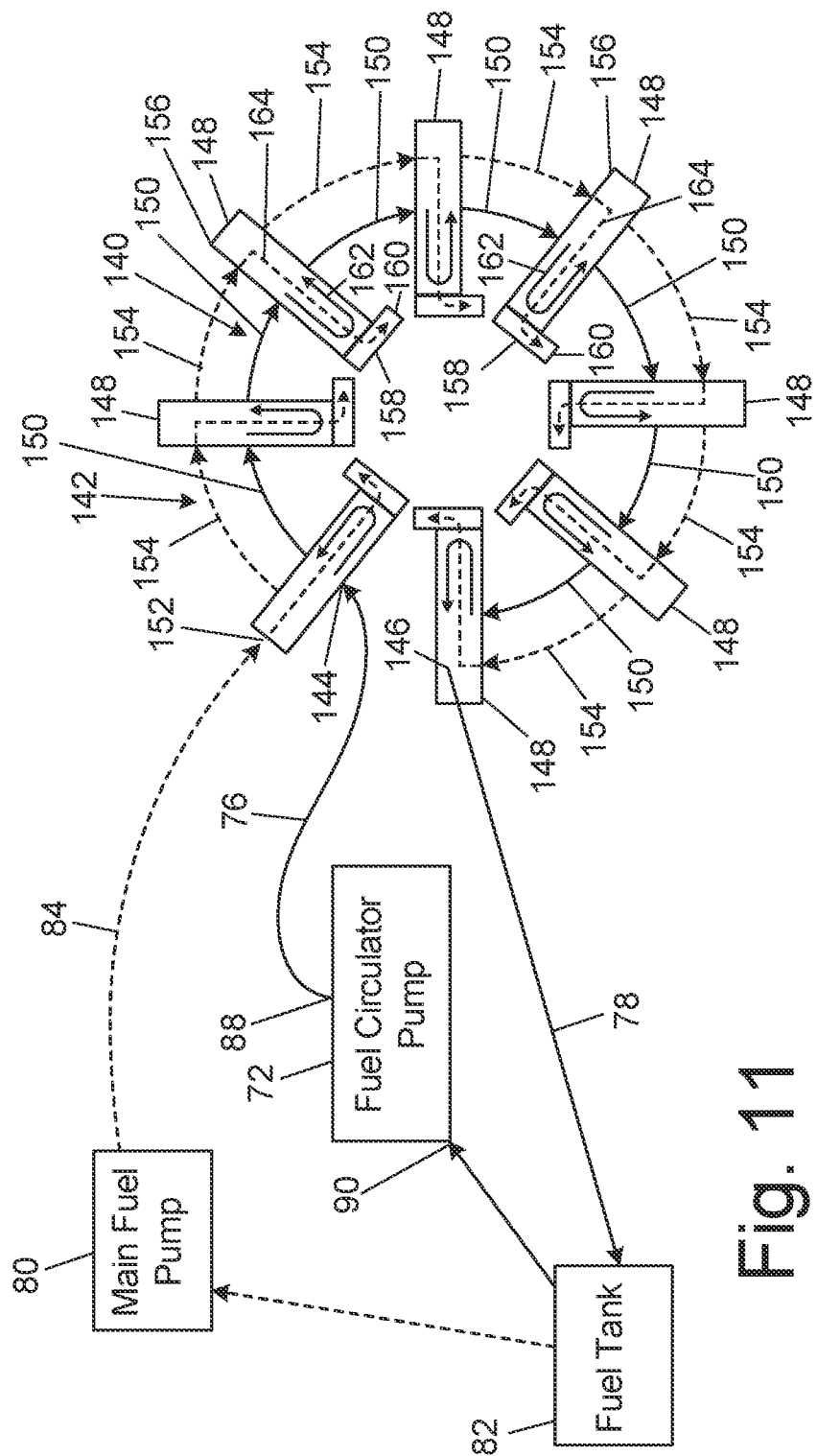
FIG. 11 is a schematic illustration of another example of a fuel system with a fuel circulator pump and a circulation circuit for circulating fuel through an array of fuel injectors post shutdown of the gas turbine engine of FIG. 1.

FIG. 11 is a schematic illustration of another example fuel system 66 with first manifold assembly 140 dedicated to circulating fuel through fuel system 66 and second manifold assembly 142 dedicated to delivering fuel to combustor 56. As shown in FIG. 11, first manifold assembly 140 can include first assembly inlet 144, first assembly outlet 146, fuel injectors 148, and primary fuel manifolds 150. Second manifold assembly 142 can include second assembly inlet 152, fuel injectors 148, and secondary fuel manifolds 154. Each fuel injector 148 can include strut 156, nozzle head 158, nozzle exit 160, first passage 162, and second passage 164.

First passage 162 in each fuel injector 148 is a cooling passage that extends radially inward, relative to center axis CA, though strut 156 to nozzle head 158 and then turns and extends radially outward through strut 156. First passage 162 is solely a cooling passage in fuel injector 148 and does not fluidically connect with nozzle exit 160. Second passage 164 in each fuel injector 148 is a fuel supply passage that extends radially inward, relative to center axis CA, through strut 156 to nozzle head 158 to fluidically connect with nozzle exit 160. Second passage 164 is separate from first passage 162 and does not fluidically connect with first passage 162 in fuel injector 148.

Primary fuel manifolds 150 fluidically connect first passage 162 of each fuel injector 148 to first assembly inlet 144 and first assembly outlet 146. First assembly inlet 144 is fluidically connected to pump outlet 88 of fuel circulator pump 72 by fuel supply line 76. First assembly outlet 146 is fluidically connected to fuel tank 82 by fuel return line 78. Pump inlet 90 of fuel circulator pump 72 is fluidically connected to fuel tank 82. Together, fuel circulator pump 72, fuel supply line 76, primary fuel manifolds 150, first passages 162 of fuel injectors 148, fuel return line 78, and fuel tank 82 form a cooling circuit that circulates fuel to cool fuel injectors 148 while gas turbine engine 20 is off and still hot.

Secondary fuel manifolds 154 fluidically connect second passage 164 of each fuel injector 148 to second assembly inlet 152. Second assembly inlet 152 is fluidically connected to an outlet of main fuel pump 80 by main pump line 84. An inlet of main fuel pump 80 is fluidically connected to fuel tank 82. Together, fuel tank 82, main fuel pump 80, main pump line 84, secondary fuel manifolds 154, and second passages 164 of each fuel injector 148 form a fuel delivery path that delivers fuel to nozzle exits 160 and combustor 56 when gas turbine engine 20 is on. By having a cooling circuit that is separate from the fuel delivery path, internal valves are not needed in fuel injectors 148. Furthermore, the cooling circuit can operate simultaneous to the fuel delivery path in the event fuel injectors 148 require additional cooling while gas turbine engine 20 is on.

Discussion of Possible Embodiments

The following are non-exclusive descriptions of possible embodiments of the present invention.

A fuel system for a gas turbine engine includes a manifold assembly with an assembly inlet, an assembly outlet, and a plurality of fuel injectors. The manifold assembly also includes at least one fuel manifold fluidically connecting each fuel injector of the plurality of fuel injectors to the assembly inlet and to the assembly outlet. A fuel return line is fluidically connected to the assembly outlet. A fuel circulator pump includes a pump outlet fluidically connected to the assembly inlet.

The fuel system of the preceding paragraph can optionally include, additionally and/or alternatively, any one or more of the following features, configurations and/or additional components in the paragraphs below.

In an embodiment of the foregoing fuel system, the fuel circulator pump further comprises a pump inlet, wherein the pump inlet is fluidically connected to the fuel return line.

In an embodiment of the foregoing fuel system, the fuel system further comprises: a fuel tank; a main fuel pump comprising: a main pump inlet fluidically connected to the fuel tank; and a main pump outlet fluidically connected to the assembly inlet; and a check valve fluidically connecting the main pump outlet to the assembly inlet.

In an embodiment of the foregoing fuel system, the fuel circulator pump comprises a shut off valve configured to open and close the pump inlet and/or the pump outlet of the fuel circulator pump.

In an embodiment of the foregoing fuel system, each fuel injector of the plurality of fuel injectors comprises: a strut; a nozzle head; a supply passage in the strut that is fluidically connected to the at least one fuel manifold; and an internal valve fluidically connecting the supply passage to the nozzle head.

In an embodiment of the foregoing fuel system, the internal valve is a pressure relief valve.

In an embodiment of the foregoing fuel system, the internal valve comprises an electrical actuator.

In an embodiment of the foregoing fuel system, the fuel circulator pump is mechanically coupled to a core turning motor of a gas turbine engine.

In an embodiment of the foregoing fuel system, the fuel circulator pump is an electrically powered fuel pump.

In an embodiment of the foregoing fuel system, the fuel system further comprises a fuel tank; a main fuel pump comprising: a main pump inlet fluidically connected to the fuel tank; and a main pump outlet fluidically connected to the assembly inlet; and a check valve fluidically connecting the main pump outlet to the assembly inlet, and wherein the fuel return line is connected to the fuel tank.

In an embodiment of the foregoing fuel system, the fuel circulator pump further comprises a pump inlet, wherein the pump inlet is fluidically connected to the fuel tank.

In an embodiment of the foregoing fuel system, the fuel system further comprises: a fuel tank; a second manifold assembly comprising: a second assembly inlet; the plurality of fuel injectors; and at least one secondary manifold fluidically connecting each fuel injector of the plurality of fuel injectors to the second assembly inlet; and a main fuel pump comprising: a main pump inlet fluidically connected to the fuel tank; and a main pump outlet fluidically connected to the second assembly inlet, and wherein a pump inlet of the fuel circulator pump is fluidically connected to the fuel tank and the fuel return line is fluidically connected to the fuel tank.

In an embodiment of the foregoing fuel system, each fuel injector of the plurality of fuel injectors comprises: a strut; a nozzle head; a first passage in the strut that is fluidically connected to the at least one fuel manifold and fluidically isolated from an exit of the nozzle head; and a second passage in the strut that is fluidically connected to the at least one secondary manifold and to the exit of the nozzle head.

A method is disclosed for cooling a fuel system of a gas turbine engine. The method includes shutting down the gas turbine engine. After shutting down the gas turbine engine, a fuel circulator pump is activated to flow fuel into at least one fuel manifold and a plurality of fuel injectors fluidically connected to the at least one fuel manifold. The fuel is directed from the at least one fuel manifold and the plurality of fuel injectors into a fuel return line.

The method of the preceding paragraph can optionally include, additionally and/or alternatively, any one or more of the following features, configurations and/or additional components in the paragraphs below.

In an embodiment of the foregoing method, the method further includes directing the fuel in the fuel return line to an inlet of the fuel circulator pump.

In an embodiment of the foregoing method, the method further includes directing the fuel in the fuel return line to a fuel tank, and wherein an inlet of the fuel circulator pump is fluidically connected to the fuel tank.

In an embodiment of the foregoing method, the method further includes: closing a nozzle exit on each fuel injector of the plurality of fuel injectors after shutting down the gas turbine engine to prevent the fuel from passing through the nozzle exit of each fuel injector of the plurality of fuel injectors; and flowing the fuel radially inward inside each fuel injector of the plurality of fuel injectors relative to a center axis of the gas turbine engine; flowing the fuel radially outward inside of each fuel injector of the plurality of fuel injectors relative to the center axis of the gas turbine engine; and directing the fuel out of each fuel injector of the plurality of fuel injectors and toward the fuel return line.

In an embodiment of the foregoing method, the method further includes fluidically disconnecting a main fuel pump as part of shutting down the gas turbine engine by closing a check valve that is fluidically connected between an outlet of the main fuel pump and the at least one fuel manifold.

A fuel injector for a gas turbine engine includes a strut and a nozzle head connected to the strut. The nozzle head includes a nozzle exit. A supply passage extends through the strut to the nozzle head. A return passage extends through the strut toward the nozzle head. A valve is within the strut and/or nozzle head and fluidically connects the supply passage to the nozzle exit.

The fuel injector of the preceding paragraph can optionally include, additionally and/or alternatively, any one or more of the following features, configurations and/or additional components in the paragraphs below.

In an embodiment of the foregoing fuel injector, the valve is at least one of a pressure relief valve and an electrically actuated valve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system for a gas turbine engine comprises:
   a manifold assembly comprising:
      an assembly inlet;
      an assembly outlet;
      a plurality of fuel injectors, each of the plurality of fuel injectors further comprising:
         a strut extending radially inward from an outer end toward a center axis of the gas turbine engine;
         a nozzle head connected to the strut opposite the outer end of the strut;
         a first valve seat in the strut and closer to the nozzle head than to the outer end of the strut, or the first valve seat is in the nozzle head;
         a second valve seat in the strut and closer to the nozzle head than to the outer end of the strut, or the second valve seat is in the nozzle head;
         a return passage extending from the outer end of the strut to the first valve seat;
         a supply passage extending from the outer end of the strut to the second valve seat;
         a nozzle exit formed on the nozzle head and fluidically connected to the second valve seat; and
         a valve head between the first valve seat and the second valve seat,
         wherein in a first position the valve head is against the first valve seat and fluidically opens the nozzle exit to the supply passage and fluidically closing the return passage to both the nozzle exit and the supply passage when the gas turbine engine is on, and
         wherein in a second position the valve head is against the second valve seat and fluidically closes the nozzle exit to both the supply passage and the return passage and fluidically opens the return passage to the supply passage when the gas turbine engine is off; and
   at least one fuel manifold fluidically connecting each fuel injector of the plurality of fuel injectors to the assembly inlet and to the assembly outlet;
   a fuel return line fluidically connected to the assembly outlet; and
   a fuel circulator pump comprising:
      a pump outlet fluidically connected to the assembly inlet.

2. The fuel system of claim 1, wherein the fuel circulator pump further comprises:
   a pump inlet, wherein the pump inlet is fluidically connected to the fuel return line.

3. The fuel system of claim 2, further comprising:
   a fuel tank;
   a main fuel pump comprising:
      a main pump inlet fluidically connected to the fuel tank; and
      a main pump outlet fluidically connected to the assembly inlet; and
   a check valve fluidically connecting the main pump outlet to the assembly inlet.

4. The fuel system of claim 3, wherein the fuel circulator pump comprises:
   a shut off valve configured to open and close the pump inlet and/or the pump outlet of the fuel circulator pump.

5. The fuel system of claim 1, further comprising:
   an electrical actuator; and a drive shaft extending through the strut to connect the valve head to the electrical actuator.

6. The fuel system of claim 1, wherein the fuel circulator pump is mechanically coupled to a core turning motor of a gas turbine engine.

7. The fuel system of claim 1, wherein the fuel circulator pump is an electrically powered fuel pump.

8. The fuel system of claim 1, further comprising:
a fuel tank;
a main fuel pump comprising:
   a main pump inlet fluidically connected to the fuel tank; and
   a main pump outlet fluidically connected to the assembly inlet; and
a check valve fluidically connecting the main pump outlet to the assembly inlet, and
wherein the fuel return line is connected to the fuel tank.

9. The fuel system of claim 8, wherein the fuel circulator pump further comprises:
a pump inlet, wherein the pump inlet is fluidically connected to the fuel tank.

10. A fuel system for a gas turbine engine comprises:
a fuel tank;
a first manifold assembly further comprising:
   a first assembly inlet;
   a first assembly outlet;
   a plurality of fuel injectors; and
   a first fuel manifold fluidically connecting each fuel injector of the plurality of fuel injectors to the first assembly inlet and to the first assembly outlet;
a fuel return line fluidically connected to the first assembly outlet;
a fuel circulator pump comprising:
   a circulator pump inlet;
   a circulator pump outlet fluidically connected to the first assembly inlet;
a second manifold assembly comprising:
   a second assembly inlet;
   the plurality of fuel injectors; and
   a-second manifold fluidically connecting each fuel injector of the plurality of fuel injectors to the second assembly inlet; and
a main fuel pump comprising:
   a main pump inlet fluidically connected to the fuel tank; and
   a main pump outlet fluidically connected to the second assembly inlet.

11. The fuel system of claim 10, wherein each fuel injector of the plurality of fuel injectors comprises:
a strut;
a nozzle head;
a first passage in the strut that is fluidically connected to the first fuel manifold and fluidically isolated from an exit of the nozzle head; and
a second passage in the strut fluidically connecting the second manifold to the exit of the nozzle head.

12. A gas turbine engine, the gas turbine engine comprising:
a low-speed spool;
a high-speed spool;
a manifold assembly comprising:
   an assembly inlet;
   an assembly outlet;
   a plurality of fuel injectors;
   at least one fuel manifold fluidically connecting each fuel injector of the plurality of fuel injectors to the assembly inlet and to the assembly outlet;
a main fuel pump fluidically connected to the assembly inlet;
a fuel circulator pump comprising:
   a pump outlet fluidically connected to the assembly inlet;
   a pump inlet fluidically connected to the assembly outlet;
a core turning motor mechanically coupled to the fuel circulator pump; and
a coupling, wherein the coupling mechanically connects the core turning motor to the low-speed spool.

13. The fuel system of claim 12, wherein the coupling mechanically disconnects the core turning motor to the low-speed spool and the coupling mechanically connects the core turning motor to the high-speed spool.

* * * * *